US012634573B2

(12) United States Patent 
Yamasaki et al.

(10) Patent No.: US 12,634,573 B2 
(45) Date of Patent: May 19, 2026

(54) IMAGING APPARATUS

(71) Applicant: Panasonic Intellectual Property Management Co., Ltd., Osaka (JP)

(72) Inventors: Takaaki Yamasaki, Osaka (JP); Takakazu Bito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 199 days.

(21) Appl. No.: 18/380,162

(22) Filed: Oct. 14, 2023

(65) Prior Publication Data

US 2024/0137642 A1 Apr. 25, 2024 
US 2024/0236475 A9 Jul. 11, 2024

(30) Foreign Application Priority Data

Oct. 19, 2022 (JP) ................................. 2022-167573

(51) Int. Cl.
H04N 23/62 (2023.01) 
H04N 23/69 (2023.01) 
H04N 23/80 (2023.01)

(52) U.S. Cl.
CPC ............. H04N 23/62 (2023.01); H04N 23/69 (2023.01); H04N 23/815 (2023.01)

(58) Field of Classification Search
CPC ...... H04N 23/62; H04N 23/69; H04N 23/815; H04N 23/631; H04N 23/632; H04N 23/633; H04N 23/663 
See application file for complete search history.

(56) References Cited

U.S. PATENT DOCUMENTS

| | | | | |
|---|---|---|---|---|
| 5,243,372 A | * | 9/1993 | Suzuki | G02B 7/102 |
| | | | | 396/76 |
| 5,537,174 A | * | 7/1996 | Ishikawa | G02B 7/102 |
| | | | | 396/76 |
| 2002/0154912 A1 | | 10/2002 | Koseki et al. | |
| 2006/0290792 A1 | * | 12/2006 | Nikkanen | H04N 5/2628 |
| | | | | 348/240.2 |
| 2012/0062692 A1 | * | 3/2012 | Tsubusaki | H04N 23/635 |
| | | | | 348/36 |

FOREIGN PATENT DOCUMENTS

| | | |
|---|---|---|
| JP | H04-284433 A | 10/1992 |
| JP | 2002-314868 A | 10/2002 |
| JP | 2005-107290 A | 4/2005 |
| JP | 2007-135133 A | 5/2007 |
| JP | 2021057656 A * | 4/2021 |

* cited by examiner

*Primary Examiner* — Timothy J Henn 
(74) *Attorney, Agent, or Firm* — Renner, Otto, Boisselle & Sklar, LLP

(57) ABSTRACT

An imaging apparatus includes: an image sensor configured to capture a subject image via an optical system to generate image data; an input interface configured to acquire a zoom amount indicating a degree of a zoom operation by a user for an optical system; a controller configured to scale a cropped image from the image data to change, from a first focal length, a second focal length, according to the zoom amount acquired by the input interface, the first focal length being formed by the optical system and the second focal length corresponding to an angle of view of the subject image in the image data; and a setting interface configured to set a setting range, based on a user operation input before the zoom operation, the setting range enabling the second focal length to change according to the zoom amount.

10 Claims, 10 Drawing Sheets

130

Hybrid zoom setting

50 —
- 1.5 times only at T end [4K/FHD]
- 3 times only at T end [FHD]
- Free setting (numerical value input)
- Free setting (live view input)

51
W end 20mm ~ 180mm T end

T-END USER SETTING

W-END USER SETTING

ZOOMING (WITHOUT USER SETTING)

ZOOMING (WITH USER SETTING)

ELECTRONIC ZOOM

ELECTRONIC ZOOM MAGNIFICATION n f2／ft f1／fw

1 fw        ft        FOCAL LENGTH
                    (OPTICAL)

HYBRID ZOOM

ZOOM RING ANGLE

T END

W END fw  f1    ft      f2    n×ft  FOCAL LENGTH
                                (SUBSTANTIAL)

IMAGING APPARATUS

TECHNICAL FIELD

The present disclosure relates to an imaging apparatus having an electronic zoom function in accordance with optical zoom, for example.

BACKGROUND ART

JP H4-284433 A discloses a trimming camera system including a camera body having an electronic zoom operation member for changing a trimming magnification and a zoom lens attachable to and detachable from the camera body and having an optical zoom operation member for setting a photographing magnification thereof. In this system, a magnification program line is used in which the trimming magnification of the electronic zoom is 1 when the pseudo focal length obtained by combining the optical zoom and the electronic zoom is a predetermined value or less, and the trimming magnification of the electronic zoom and the photographing magnification of the optical zoom are determined when the focal length is larger than the predetermined value.

SUMMARY

The present disclosure provides an imaging apparatus capable of facilitating to capture an image in a range of a focal length desirable for a user.

An imaging apparatus according to the present disclosure includes: an image sensor configured to capture a subject image via an optical system to generate image data; an input interface configured to acquire a zoom amount indicating a degree of a zoom operation by a user for an optical system; a controller configured to scale a cropped image from the image data to change, from a first focal length, a second focal length, according to the zoom amount acquired by the input interface, the first focal length being formed by the optical system and the second focal length corresponding to an angle of view of the subject image in the image data; and a setting interface configured to set a setting range, based on a user operation input before the zoom operation, the setting range enabling the second focal length to change according to the zoom amount.

According to the imaging apparatus of the present disclosure, it is possible to easily capture an image in a range of a focal length desirable for a user.

BRIEF DESCRIPTION OF DRAWINGS

FIGS. 6A to 6C are diagrams for illustrating an example of hybrid zoom setting in the digital camera;

DETAILED DESCRIPTION

Hereinafter, embodiments will be described in detail with reference to the drawings as appropriate. However, a detailed description more than necessary may be omitted. It should be noted that the accompanying drawings and the following description are provided for a person skilled in the art to fully understand the present disclosure. Thus, the drawings and the description are not intended to limit the subject matter defined in the claims.

First Embodiment

Hereinafter, the configuration and operation of a digital camera being an embodiment of an imaging apparatus according to the present disclosure will be described.

1. Configuration

Figure 1:
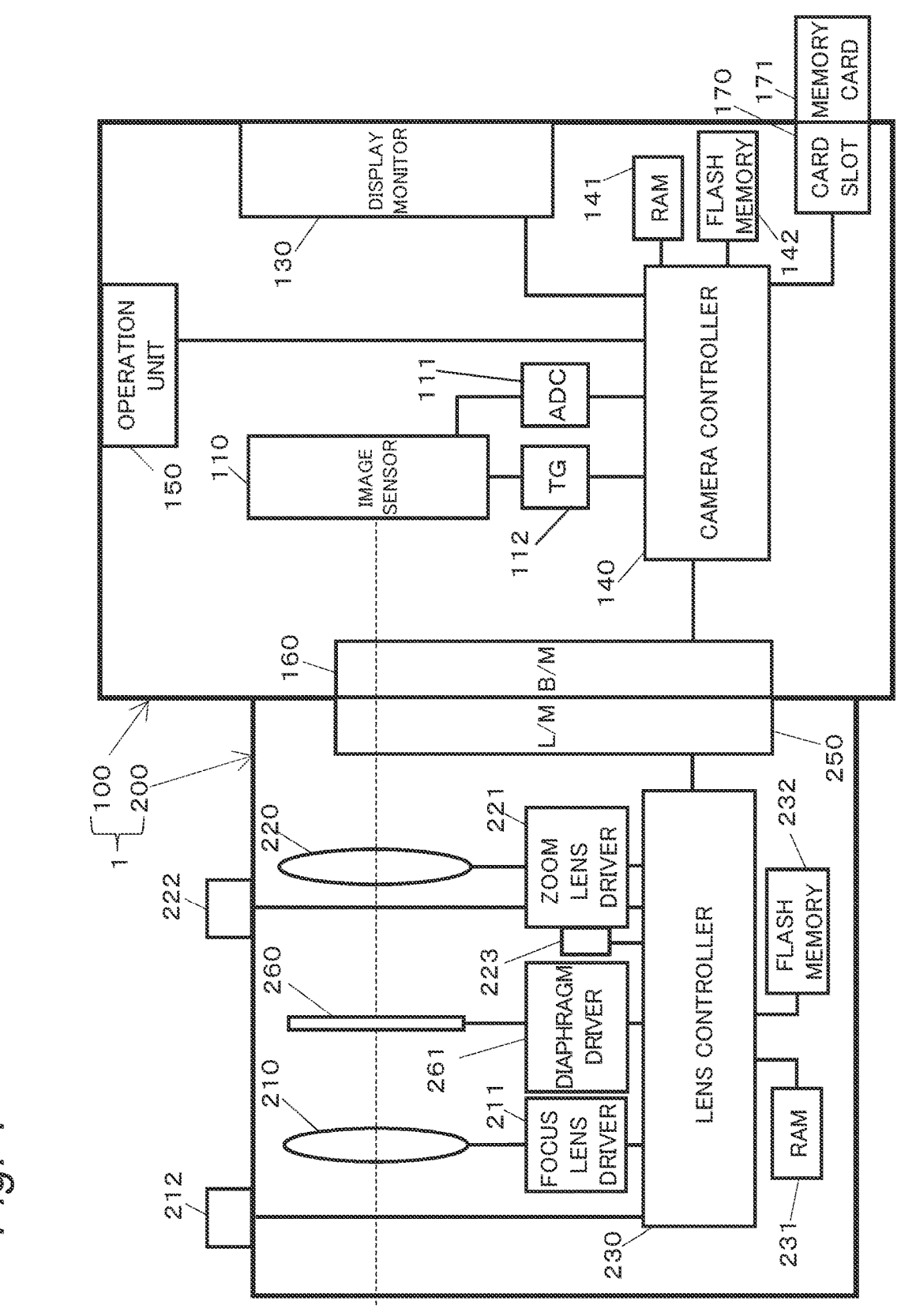
FIG. 1 is a block diagram showing a configuration of a digital camera according to a first embodiment of the present disclosure.

FIG. 1 is a block diagram showing the configuration of a digital camera 1 according to the first embodiment. The digital camera 1 of the present embodiment includes a camera body 100 and an interchangeable lens 200 attachable thereto and detachable therefrom.

1-1. Camera Body

The camera body 100 (an example of an imaging apparatus) includes an image sensor 110, a display monitor 130, an operation unit 150, a camera controller 140, a RAM 141, a flash memory 142, a body mount 160, and a card slot 170.

The image sensor 110 is an element that captures a subject image incident through the interchangeable lens 200 to generate image data (also referred to as imaging data). The image sensor 110 is a CMOS image sensor, for example. The generated image data is digitized by an AD converter 111. Predetermined image processing is performed on the digitized image data by the camera controller 140. The predetermined image processing includes gamma correction processing, white balance correction processing, flaw correction processing, YC conversion processing, electronic zoom processing, and JPEG compression processing, for example. The image sensor 110 may be a CCD image sensor, an NMOS image sensor, or the like.

The image sensor 110 operates at the timing controlled by the timing generator 112. The image sensor 110 generates a still image or a moving image for recording, or a live view image. The live view image is an example of a moving image displayed on the display monitor 130 in order to visualize the real-time imaging result by the image sensor 110 for the user.

The display monitor 130 is an example of a display that displays various pieces of information such as an image, such as a live view image, and a menu screen on a display screen. The display monitor 130 may include, for example, various display devices such as a liquid crystal display device or an organic EL device. In addition to or instead of the display monitor 130, the digital camera 1 may include an electronic viewfinder (EVF) or the like including a display screen as an example of another display in the camera body 100, for example.

The operation unit 150 is a generic name for a user interface that can input an operation (instruction) from the user. When receiving an input of a user operation, the operation unit 150 transmits an operation signal indicating various instructions according to the user operation to the camera controller 140. The operation unit 150 includes, for example, physical buttons, levers, dials, touch panels, switches, and the like. The operation unit 150 may also include virtual buttons and icons displayed on the display monitor 130.

The camera controller 140 controls the operation of the entire digital camera 1 by controlling components such as the image sensor 110 according to instructions from the operation unit 150. The camera controller 140 may include a hard-wired electronic circuit, or a microcomputer and the like that executes a program. The camera controller 140 transmits a vertical synchronization signal to the timing generator 112. In parallel with this, the camera controller 140 generates a synchronization signal synchronized with the vertical synchronization signal, and transmits the synchronization signal to the lens controller 230 via the body mount 160 and the lens mount 250. The camera controller 140 uses a RAM 141 as a work memory during control operations and image processing operations.

The flash memory 142 stores programs and parameters used when the camera controller 140 performs control.

The body mount 160 is mechanically and electrically connectable to the lens mount 250 of the interchangeable lens 200. The body mount 160 can transmit and receive data to and from the interchangeable lens 200 via the lens mount 250. The body mount 160 transmits the exposure synchronization signal received from the camera controller 140 to the lens controller 230 via the lens mount 250.

The body mount 160 transmits other control signals received from the camera controller 140 to the lens controller 230 via the lens mount 250. The body mount 160 transmits the signal received from the lens controller 230 via the lens mount 250 to the camera controller 140.

The card slot 170 can mount a memory card 171, and controls the memory card 171 based on control from the camera controller 140. The digital camera 1 can store image data into the memory card 171 and can read image data from the memory card 171.

1-2. Interchangeable Lens

As shown in FIG. 1, the interchangeable lens 200 is an example of an optical system including, for example, a focus lens 210, a zoom lens 220, a diaphragm 260, and the like. The interchangeable lens 200 further includes various drivers 211, 221, and 261, a lens controller 230, a RAM 231, a flash memory 232, and a lens mount 250. The interchangeable lens 200 may further include a camera shake correction lens in addition to the lens shown in FIG. 1.

The interchangeable lens 200 further includes operation members such as a focus ring 212 and a zoom ring 222, for example. The operation member of the interchangeable lens 200 is not limited thereto, and may include, for example, a button or the like provided on the exterior.

The lens controller 230 controls the operation of the entire interchangeable lens 200. The lens controller 230 may include a hard-wired electronic circuit, or a microcomputer and the like that executes a program.

The RAM 231 functions as a work memory used when the lens controller 230 performs control. The flash memory 232 stores programs, parameters, lens data, and the like used during the control by the lens controller 230.

The zoom lens 220 is a lens for changing magnification of a subject image formed by the optical system of the interchangeable lens 200. The lens configuration of the zoom lens 220 may be any number of lenses or any number of groups. The zoom lens driver 221 is a mechanical mechanism that moves the zoom lens 220 along the optical axis of the optical system based on the operation of the zoom ring 222 by the user. The position of the zoom lens 220 is detected by the zoom lens position detection unit 223 as needed, and is notified to the lens controller 230.

The zoom ring 222 has a predetermined angular range (e.g., 90°) within which an optical focal length by the zoom lens 220 in the interchangeable lens 200 is movable between a wide-angle end serving as the shortest and a telephoto end serving as the longest. The zoom ring 222 is an example of an operation member that can perform a zoom operation by being operated at various rotation angles within the angular range.

The focus lens 210 is a lens for changing a focus state of a subject image incident from the optical system and formed on the image sensor 110. The lens configuration of the focus lens 210 may be any number of lenses or any number of groups. The focus lens driver 211 drives the focus lens 210 to move back and forth along the optical axis of the optical system based on the control of the lens controller 230. The focus lens driver 211 can be achieved by, for example, a stepping motor, a DC motor, an ultrasonic motor, or the like.

The diaphragm 260 adjusts the amount of light incident on the image sensor 110. The diaphragm 260 is driven by a diaphragm driver 262, and the size of the opening is controlled. The diaphragm driver 262 includes a motor or an actuator.

2. Operation

The operation of the digital camera 1 configured as described above will be described in the following.

In the digital camera 1 of the present embodiment, the interchangeable lens 200 performs optical zoom for driving the zoom lens 220 so as to change an optical focal length in accordance with an operation (an example of a zoom operation) for the user to rotate the zoom ring 222.

The digital camera 1 of the present embodiment performs a hybrid zoom operation that is an operation to perform electronic zoom cropping an image from imaging data of the image sensor 110 with the optical zoom being interlocked, according to the zoom operation as described above. According to this hybrid zoom operation, a range of a substantial focal length (in other words, a pseudo focal length) can be extended from a range of an optical focal length of the interchangeable lens 200, the pseudo focal length being the substantial focal length taking an effect of electronic zoom into account similarly to optical zoom on image data of an image shooting result.

The digital camera 1 of the present embodiment sets the focal length range used in this hybrid zoom operation based on a user operation in advance (hereinafter referred to as "hybrid zoom setting"). According to the hybrid zoom setting of the present embodiment, in various situations where the user captures a moving image or a still image of a desired subject, it is possible to use the digital camera 1 as if a focal length range desirable for the user is included in the interchangeable lens 200 in use.

2-1. Overview of Operation

An overview of the operation of the hybrid zoom setting in the digital camera 1 of the present embodiment will be described with reference to FIGS. 2A to 2D.

Figures 2A, 2B, 2C, 2D:
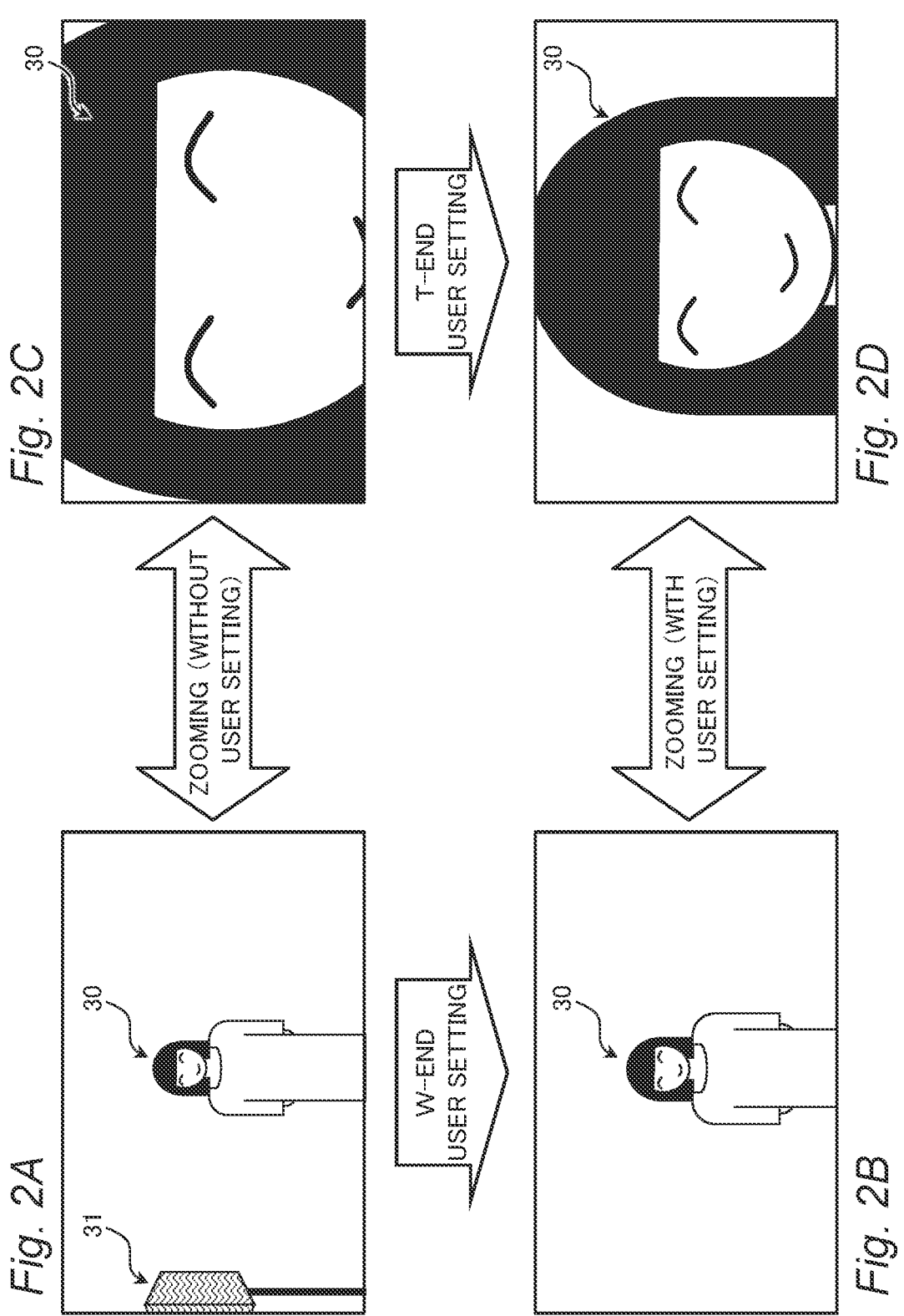
FIGS. 2A to 2D are diagrams for illustrating an overview of hybrid zoom setting in the digital camera.

FIGS. 2A and 2B respectively illustrate shot images before and after setting of the focal length at the wide-angle end (i.e., W end) in the hybrid zoom setting of the digital camera 1 in the present embodiment. FIGS. 2C and 2D respectively illustrate shot images before and after setting of the focal length at the telephoto end (i.e., T end).

In the example in FIG. 2A, the range of the angle of view in the shot image of the digital camera 1 includes, not only a subject 30 that the user of the digital camera 1 desires to image, but also an object 31 that the user does not desire to image. For example, in image shooting such as live streaming, a case is conceivable where the user does not desire to get into the picture a specific object 31 such as equipment of the image shooting studio or an object including commercial information or personal information. In this case, in the example in FIG. 2A, a failure in image shooting is conceivable that the object 31 erroneously appears in the shot image when the user unexpectedly performs the zoom-out operation up to the W end of the zoom ring 222.

For that concern, according to the digital camera 1 of the present embodiment, as exemplified in FIGS. 2A and 2B, the digital camera 1 can be set in advance so that the object 31 that the user does not desire to image is out of the angle of view range at the W end. Thus, the hybrid zoom setting of the present embodiment is possible to suppress the image-shooting failure due to the erroneous operation of zoom-out in the hybrid zoom operation in the digital camera 1, by intentionally increasing the focal length at the W end.

FIG. 2C exemplifies the state of the longest focal length based on both of the optical zoom at the T end and the maximally enlarged electronic zoom in the digital camera 1. In the present example, the subject 30 such as the face of the person that the user of the digital camera 1 desires to image is partially out of the angle of view range of the shot image. For example, a case in shooting an image of a person is conceivable where the user desires to perform various zooming with a desired region of the subject 30, such as the face of the person, being kept within the angle of view range.

For that concern, according to the digital camera 1 of the present embodiment, as exemplified in FIGS. 2C and 2D, the digital camera 1 can be set in advance so that the subject 30 that the user desires to image is kept within the angle of view range at the T end. Thus, the hybrid zoom setting of the present embodiment is possible to suppress the image-shooting failure due to excessive zoom-in, by shortening the focal length at the T end than the longest focal length. For example, it is also possible to suppress the image-shooting failure such that excessive zoom-in causes non-desired details, such as the inside of a far window, to appear.

As described above, according to the hybrid zoom setting of the present embodiment, in situations where image shooting may fail due to excessive zoom-out/zoom-in as exemplified in FIGS. 2A and 2C, the focal length at the W end/T end in the hybrid zoom operation can be set to a focal length desired by the user. Accordingly, as exemplified in FIGS. 2B and 2D, the user can avoid the image-shooting failure as shown in FIGS. 2A and 2C in the zooming from the W end to the T end, and the focal length range optimal for the image shooting situation desired by the user can be realized by the digital camera 1 in use. Details of the operation of the digital camera 1 in the present embodiment will be described below.

2-2. Details of Operation

The overall operation of the hybrid zoom setting in the digital camera 1 of the present embodiment will be described with reference to FIGS. 3 to 5.

Figure 3:
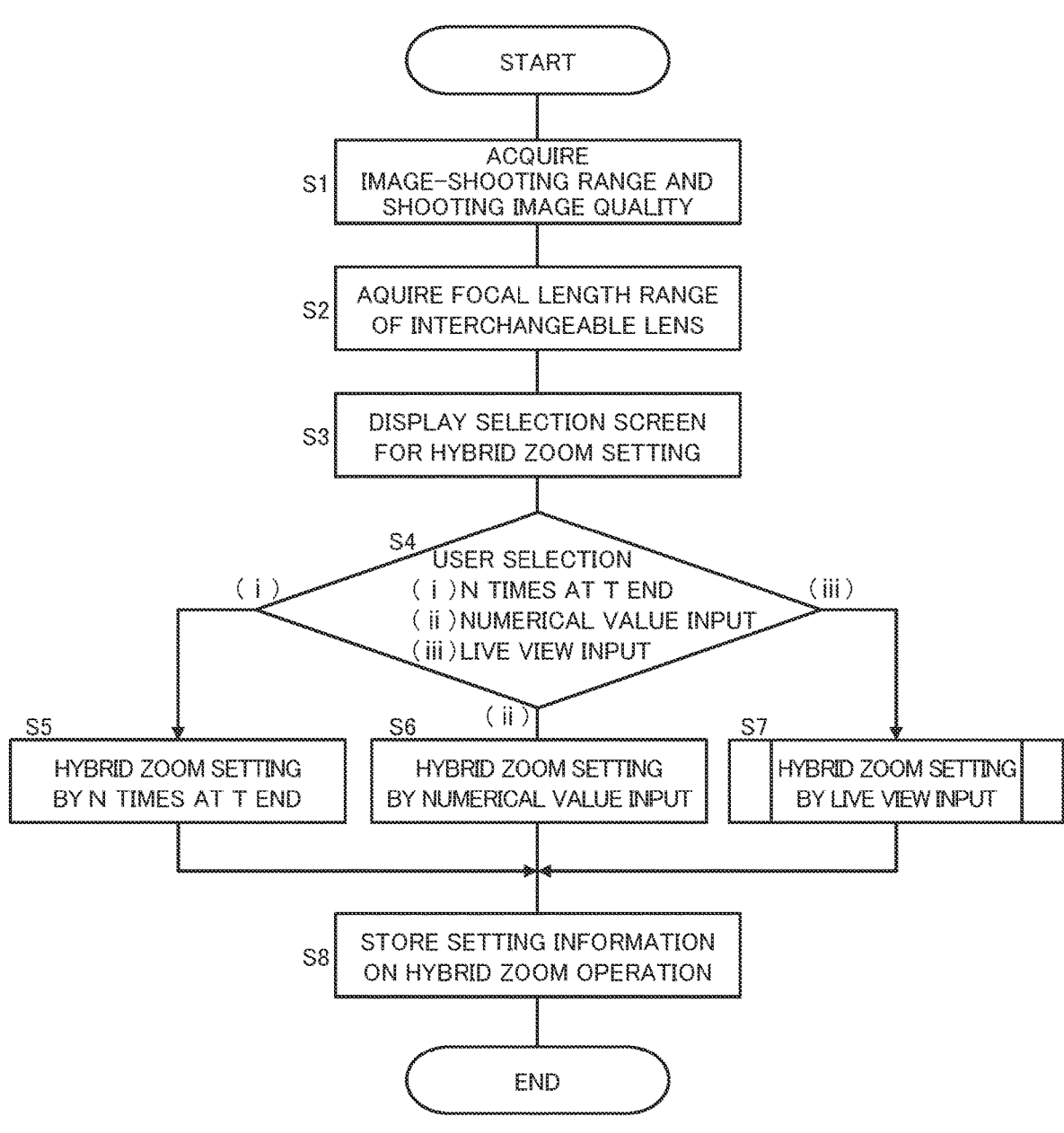
FIG. 3 is a flowchart illustrating an overall operation of hybrid zoom setting in the digital camera.

FIG. 3 is a flowchart illustrating the overall operation of hybrid zoom setting in the digital camera 1. The processing shown in the present flow is executed by the camera controller 140 of the digital camera 1, for example. The digital camera 1 of the present embodiment receives, via the operation unit 150, a user operation in a setting menu to perform hybrid zoom setting processing, for example.

Figure 4:
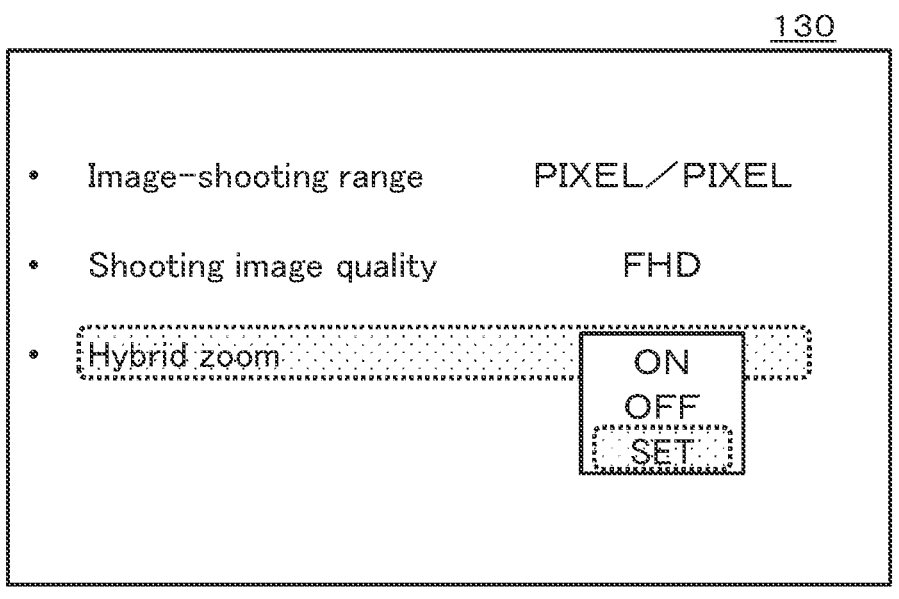
FIG. 4 is a diagram showing a display example of a setting menu in the digital camera.

FIG. 4 shows a display example of the setting menu in the digital camera 1. In the example in FIG. 4, the display monitor 130 of the digital camera 1 displays menu items such as "image-shooting range", "shooting image quality", and "hybrid zoom" in a setting menu.

In the example in FIG. 4, the "hybrid zoom" of the setting menu receives a user operation of turning ON/OFF (enabling/disabling) the hybrid zoom operation or instructing the hybrid zoom setting via the operation unit 150. For example, when the hybrid zoom setting is instructed in the setting menu, the processing shown in the flow in FIG. 3 is started.

In the example of the flow in FIG. 3, the camera controller 140 acquires the image-shooting range and the shooting image quality set in the digital camera 1 (S1). The example in FIG. 4 illustrates a state in which the image-shooting range is set to "PIXEL/PIXEL" and the shooting image quality is set to "FHD" in the digital camera 1.

The "image-shooting range" of the setting menu in the digital camera 1 sets an image range (basically) used for the shot image, within the entire region of the imaging surface of the image sensor 110, for example. For example, the image-shooting range "PIXEL/PIXEL" indicates an image range corresponding to the same number of pixels as the resolution set to the shooting image quality. In addition to the above, the setting of the image-shooting range may be selected from options such as a "full area" indicating the entire region of the image sensor 110 or an "APS-C" indicating an image range within an image circle of an APS-C compatible lens, for example.

For example, when an image-shooting range narrower than the "full area" is set, the digital camera 1 of the present embodiment performs electronic zoom so as to change a region in which an image is cropped within a range between the set image-shooting range and the entire region of the image sensor 110 in the hybrid zoom operation. Accordingly, the number of pixels corresponding to the set image-shooting range can be ensured in the hybrid zoom operation, and the sense of resolution of the shot image can be kept easily.

The "shooting image quality" sets the image quality of a shot image such as a moving image or a still image in the digital camera 1. For example, in the shooting image quality, various resolutions such as 4K, 6K, 8K, or VGA can be set as well as FHD. When the shot image is a moving image, the shooting image quality may manage, in combination with the resolution, settings such as a coding method and a frame rate of the moving image.

Returning to FIG. 3, the camera controller 140 acquires a range from the focal length (referred to as "fw") at the W end to the focal length (referred to as "ft") at the T end of the zoom lens 220 from the interchangeable lens 200 mounted on the digital camera 1 via the body mount 160 (S2). Based on the various information acquired in steps S1 to S2, the camera controller 140 causes the display monitor 130 to display a selection screen for hybrid zoom setting (S3). A display example of the display monitor 130 in step S3 is illustrated in FIG. 5.

Figure 5:
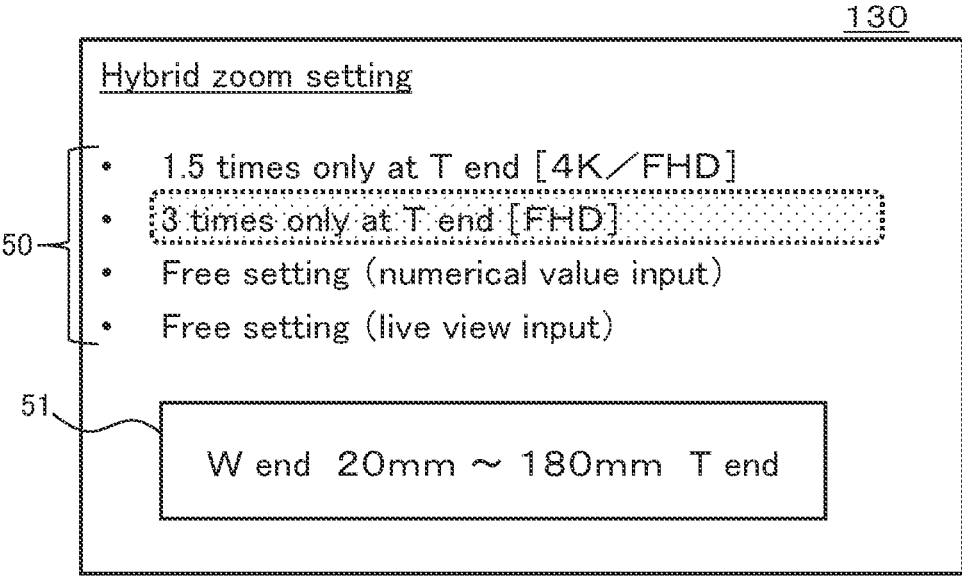
FIG. 5 is a diagram illustrating a hybrid zoom setting selection screen in the digital camera.

FIG. 5 shows an example of the selection screen on which the display monitor 130 transitions from the setting menu in the example in FIG. 4. In the example in FIG. 5, a case is illustrated where the interchangeable lens 200 mounted on the digital camera 1 has the focal length fw=20 mm at the W end and the focal length ft=60 mm at the T end as the optical focal length range by the zoom lens 220.

For example, as shown in FIG. 5, the digital camera 1 of the present embodiment provides, in hybrid zoom setting, a plurality of setting methods such as (i)n times only at the T end, (ii) numerical value input, and (iii) live view input. The selection screen illustrated in FIG. 5 includes options 50 of setting methods of the hybrid zoom setting and a display field 51 of the focal length range.

The setting method (i) is a method of setting the focal length range from the W end to the T end in the hybrid zoom operation, to a range from the focal length fw at the W end of the zoom lens 220 to n times (n>1) the focal length ft at the T end. The setting method (ii) is a method of setting the focal length range of the hybrid zoom operation by inputting any numerical value by the user. The setting method (iii) is a method of receiving an input of any focal length of the user using the live view image and setting the focal length range of the hybrid zoom operation.

In the example in FIG. 5, referring to the setting information (S1) such as the shooting image quality, the camera controller 140 presents options when the magnification n is "1.5" or "3" regarding the setting method (i) in a user-selectable manner (S3). In the example in FIG. 5, the camera controller 140 causes the focal length range of the hybrid zoom operation set in the case of n=3 to be displayed in the display field 51.

For example, in a state where the selection screen illustrated in FIG. 5 is displayed on the display monitor 130, the camera controller 140 receives a user operation for selecting any one of the setting methods (i) to (iii) in the operation unit 150 (S4). The camera controller 140 performs processing of setting the focal length range of the hybrid zoom operation according to the method selected by the user operation from the setting methods (i) to (iii) (S5 to S7). Details of the various setting methods (i) to (iii) (and corresponding processing in steps S5 to S7) will be described below.

The camera controller 140 stores the setting information (S5 to S7) on the hybrid zoom operation set by any one of the setting methods (i) to (iii) in the flash memory 142 (S8), to end the processing shown in the flow in FIG. 3, for example.

According to the above processing, in the digital camera 1 of the present embodiment, the user can set the focal length range from the W end to the T end desirable for the user him/herself, to the hybrid zoom operation using a desired method among the various setting methods (i) to (iii). Details of the setting methods (i) to (iii) will be described below.

(i) N Times at T End

For example, the setting method (i) of the hybrid zoom operation can be used when the user does not particularly change the focal length fw at the W end of the zoom lens 220 and desires to use a focal length n times longer than the focal length t at the T end. In the digital camera 1 of the present embodiment the magnification n of the electronic zoom is set within a range equal to or less than a ratio of the maximum number of pixels of the image sensor 110 to the number of pixels for image-shot recording defined by setting of an image-shooting range or the like, for example.

In steps S3 to S5 in FIG. 3, referring to the setting information (S1) on the current image-shooting range and shooting image quality in the digital camera 1, the camera controller 140 determines the magnification "n" to be presented to the user as an option. For example, in the case that the image sensor 110 has 24 million pixels at an aspect ratio of 3:2, when the shooting image quality is FHD, the camera controller 140 determines that the maximum magnification is n=3.

For example, when the shooting image quality is changed from "FHD" to "4K" in the example in FIG. 4, the digital camera 1 changes the option of n=3 to gray-out display in the screen display in FIG. 5, and presents only the option of n=1.5 in a selectable manner. When n=1 is the maximum magnification such as when the shooting image quality is changed to "6K", the digital camera 1 displays the menu item of "hybrid zoom" in FIG. 4 in a gray-out manner.

When using the setting method (i), the user designates an option of a desired magnification n from among the options presented on the selection screen of FIG. 5, for example. Then, the camera controller 140 sets the electronic zoom from the focal length fw at the W end to the focal length n×ft at the T end in the hybrid zoom operation, based on the magnification n of the option designated by the user (S5).

In the hybrid zoom setting of the present embodiment, the correspondence between the optical focal length and the electronic zoom magnification is set so that the focal length between the W end and the T end designated by the user as described above gradually changes according to the degree of the zoom operation during the hybrid zoom operation. This point will be described with reference to FIGS. 6A to 6C.

Figure 6A:
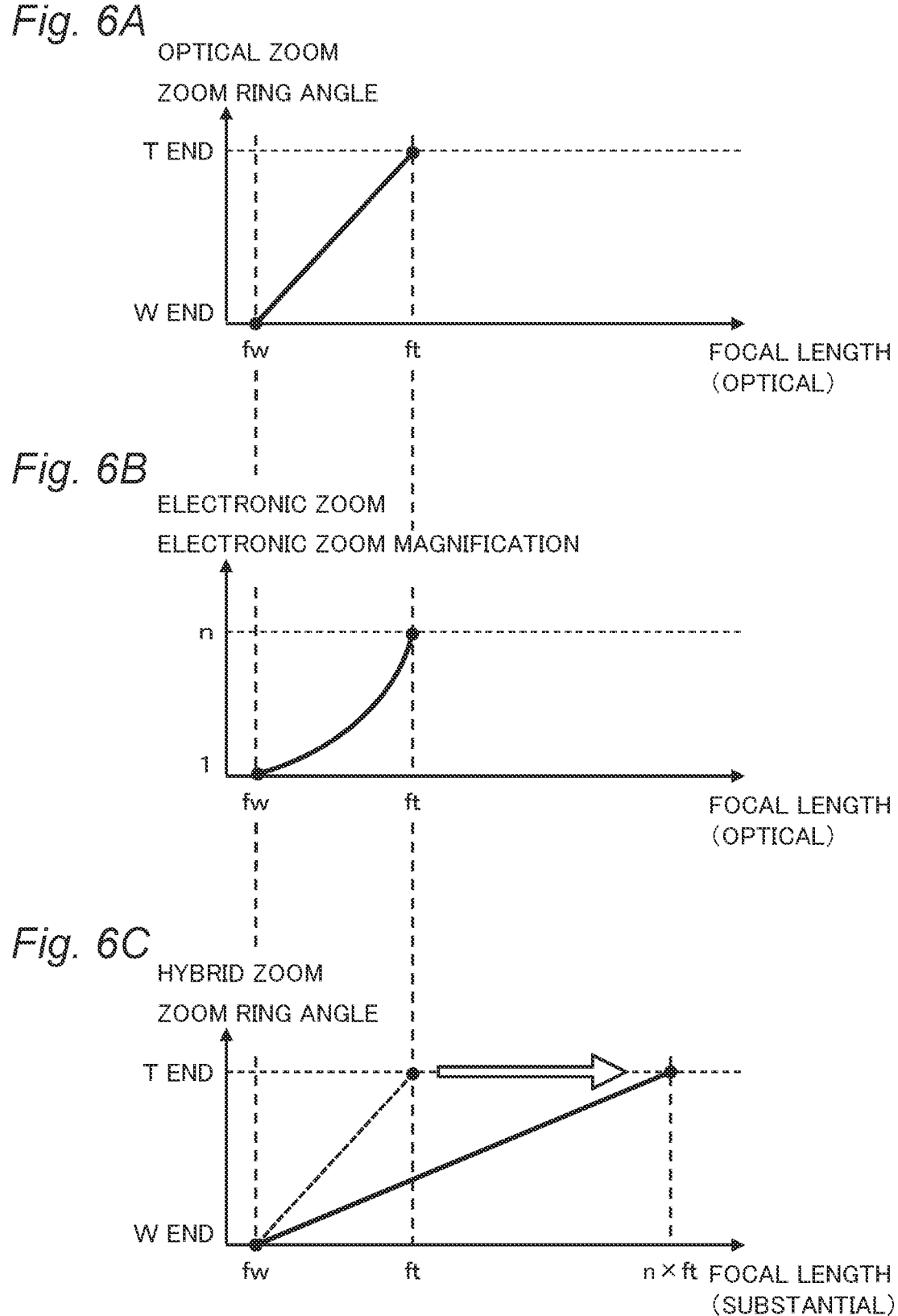

FIG. 6A illustrates a correspondence between an optical focal length of the zoom lens 220 and a rotation angle (an example of a zoom amount) of the zoom ring 222. For example, in the optical zoom in the interchangeable lens 200, as illustrated in FIG. 6A, the focal length of the zoom lens 220 linearly changes according to the rotation angle of the zoom ring 222 between the focal length fw at the W end and the focal length ft (>fw) at the T end.

FIG. 6B illustrates the setting of the electronic zoom magnification for achieving the hybrid zoom operation of the setting method (i) from the optical focal length in FIG. 6A. FIG. 6C illustrates a correspondence between the focal length of the hybrid zoom operation by the setting in FIG. 6B and the rotation angle of the zoom ring 222.

In the hybrid zoom operation of the setting method (i), as exemplified in FIG. 6B, when the zoom lens 220 has the focal length fw at the W end, the electronic zoom magnification is 1 time. On the other hand, when the zoom lens 220 has the focal length ft at the T end, the electronic zoom magnification is n times. The electronic zoom magnification gradually changes from 1 time to n times between the focal length fw at the W end and the focal length ft at the T end in the zoom lens 220.

The degree to which the electronic zoom magnification is changed as described above is set in the digital camera 1 to a setting value calculated so as to linearly change the focal length of the hybrid zoom operation according to the rotation angle of the zoom ring 222 as shown in FIG. 6C, for example.

For example in step S5, the camera controller 140 of the digital camera 1 assigns a setting value of the electronic zoom magnification (FIG. 6B or the like) for each optical focal length (FIG. 6A) classified by rotation angle of the zoom ring 222 according to a user operation such as the setting method (i)(the same applies to S6 and S7). The camera controller 140 stores the setting value of the electronic zoom magnification as described above in the flash memory 142, as setting information on a result of the hybrid zoom setting, for example (S8).

According to the above processing, the hybrid zoom operation of the digital camera 1 of the present embodiment enables the user to use the digital camera 1 with the feeling of operating the zoom ring 222 as with the optical zoom. According to the hybrid zoom operation of the digital camera 1 in the present embodiment, it is possible to reproduce a focal length range desired by the user by performing electronic zoom so as to change in conjunction with optical zoom performed according to a zoom operation of the user.

In the hybrid zoom operation, the lens controller 230 of the interchangeable lens 200 mounted on the digital camera 1 acquires the focal length of the result of the optical zoom according to the rotation angle of the zoom ring 222, for example. The lens controller 230 sequentially transmits the acquired focal length data to the camera body 100 via the lens mount 250.

In the camera body 100, the camera controller 140 receives data on the focal length from the interchangeable lens 200 via the body mount 160, and sequentially determines the electronic zoom magnification based on the focal length of the received data and the setting information on the electronic zoom (FIG. 6B and the like). For example, the camera controller 140 crops an image having a size smaller by the reciprocal of the determined electronic zoom magnification from the entire image indicated by the imaging data on the image sensor 110, and generates image data indicating an image obtained by enlarging the cropped image by the electronic zoom magnification. Thus, the hybrid zoom operation in the digital camera 1 is performed.

According to the above hybrid zoom operation, as illustrated in FIG. 6C, the focal length of the hybrid zoom operation can be gradually changed in a range from the W end to the T end according to the rotation angle of the zoom ring 222, based on the setting of the electronic zoom magnification in FIG. 6B, for example.

(ii) Numerical Value Input

In the above setting method (i), the digital camera 1 presents options for the focal length range to be selected by the user. The digital camera 1 of the present embodiment is not limited to such selection, and the focal length of the hybrid zoom operation can be more freely set by the user. As an example of the free setting, the setting method (ii) will be described with reference to FIGS. 7 to 8.

Figure 7:
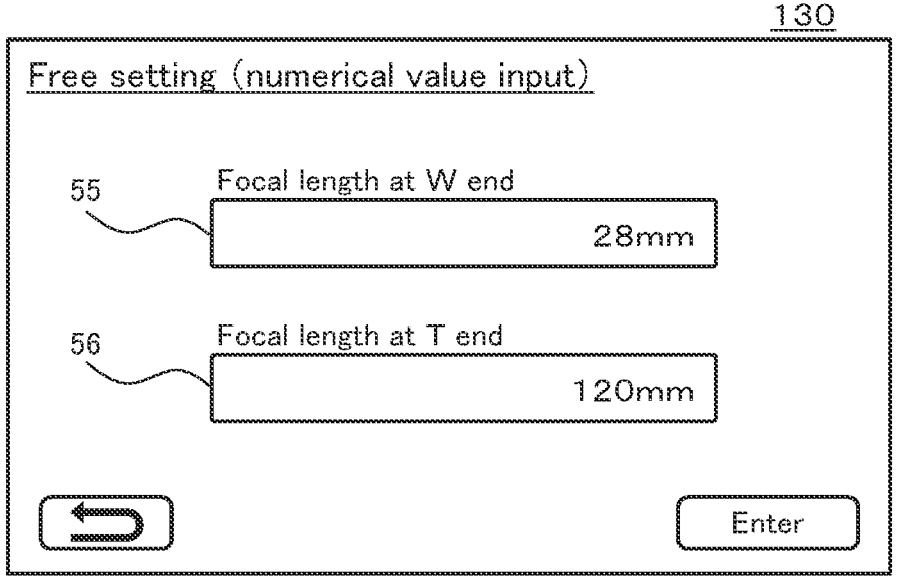
FIG. 7 is a diagram showing a display example of a numerical value input screen for hybrid zoom setting.

FIG. 7 illustrates a numerical value input screen in the hybrid zoom setting. For example, when the user operation of the option "numerical value input" in the menu display in FIG. 4 is input ((ii) in S4), the camera controller 140 causes the display monitor 130 to transition to the numerical value input screen (FIG. 7), and executes hybrid zoom setting (S6). As exemplified in FIG. 7, the numerical value input screen displayed on the display monitor 130 in step S6 includes a focal length input field 55 at the W end and a focal length input field 56 at the T end.

In step S6, by using the focal length input field 55 at the Wend for example, the camera controller 140 receives an operation of inputting the numerical value of the focal length that the user desires to use for the W end in the hybrid zoom operation within the range of the optical focal length fw at the W end or more and the focal length n×fw that is n times the optical focal length fw. For example, in the focal length input field 56 at the T end, the camera controller 140 receives a user operation of inputting the focal length at the T end in the hybrid zoom operation as a numerical value, within the range of the optical focal length ft at the T end or more and the focal length n×ft that is n times the optical focal length ft.

The magnification n in the setting method (ii) is set to the maximum value in the magnification n in the setting method (i), for example. According to the setting method (ii), the user can freely set a numerical value of a desired focal length within a range as described above, for example.

Figures 8A, 8B:
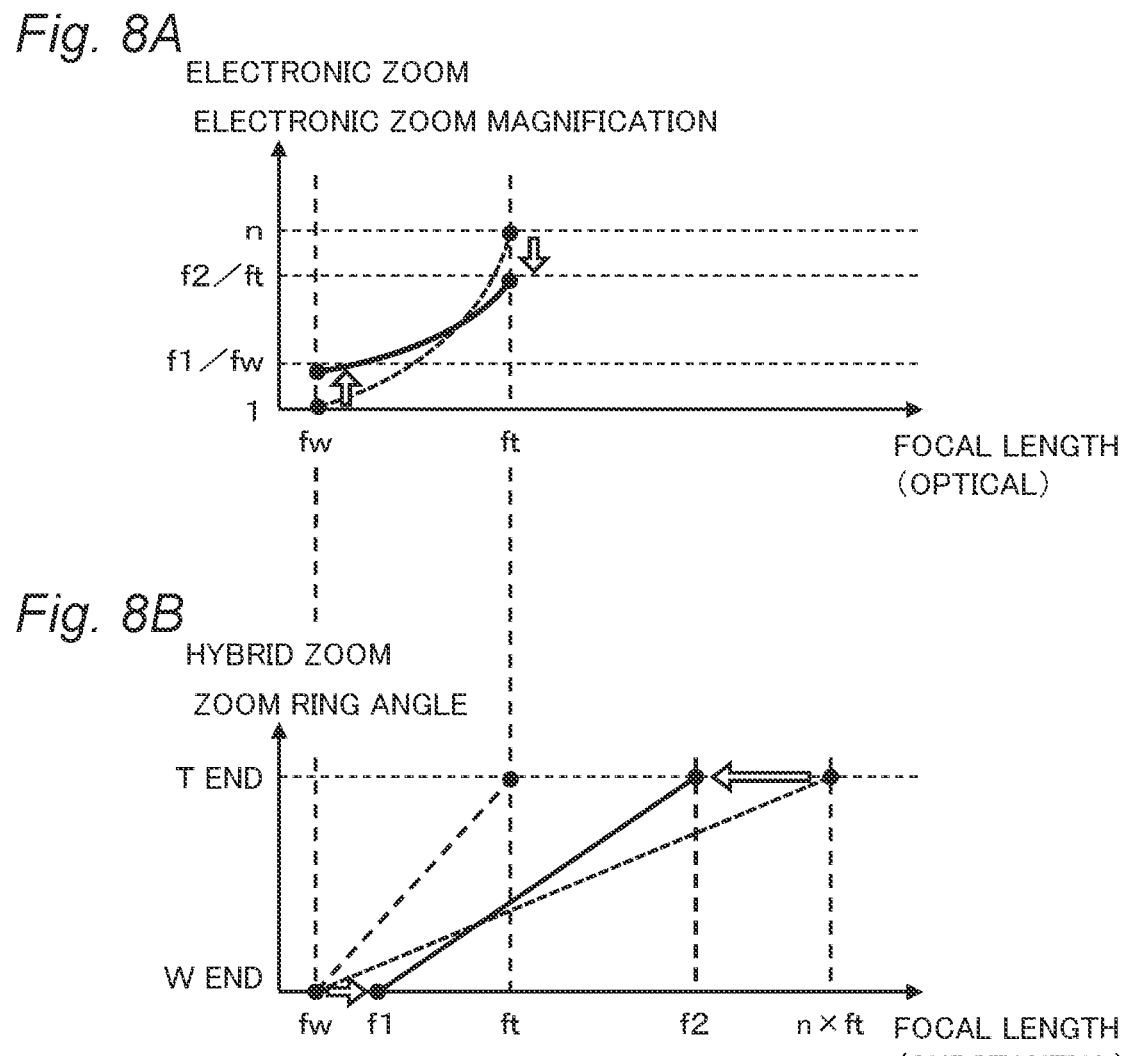
FIGS. 8A and 8B are diagrams for illustrating another example of hybrid zoom setting in the digital camera.

FIG. 8A illustrates the setting of the electronic zoom magnification for achieving the hybrid zoom operation by the free setting of the user. FIG. 8B illustrates a correspondence between the focal length of the hybrid zoom operation by the setting in FIG. 6B and the rotation angle of the zoom ring 222.

The camera controller 140 sets the electronic zoom magnification for a range from the W end to the T end in the hybrid zoom operation as exemplified in FIG. 8A, based on the focal length at the W end (referred to as "f1") and the focal length at the T end (referred to as "f2") input by the user operation on the numerical value input screen (FIG. 7), for example (S6).

In step S6, the camera controller 140 calculates the respective electronic zoom magnifications at both ends based on the focal lengths f1 and f2 at the W end and the T end, and the focal lengths fw and ft at both ends of the zoom lens 220, set by the user, for example. Furthermore, the camera controller 140 assigns the electronic zoom magnification for each focal length of the optical zoom (eventually, the rotation angle of the zoom ring 222) between the calculated electronic zoom magnifications at both ends, as in step S5 of the setting method (i), for example.

By the processing in step S6, as exemplified in FIG. 8B, the hybrid zoom setting of the digital camera 1 can be performed so that the focal length of the hybrid zoom operation gradually changes according to the focal length of the optical zoom (or the rotation angle of the zoom ring 222) between the focal lengths f1 and f2 at the W/T ends set by the user.

In the setting method (ii) as described above, when the focal length range desired to be used by the user is known, such as when the user remembers the focal length of the zoom lens separately used, the reproduction thereof can be easily performed by numerical value input, for example. Thus, the hybrid zoom operation of the digital camera 1 can be easily used.

(iii) Live View Input

In the above setting method (ii), any focal length of the user is set to the hybrid zoom operation by numerical value input. The setting method (iii) provides a method by which the user can freely set the focal length range of the hybrid zoom operation with checking the actual angle of view on the live view image in the digital camera 1. The setting method (iii) will be described with reference to FIGS. 9 to 10D.

Figure 9:
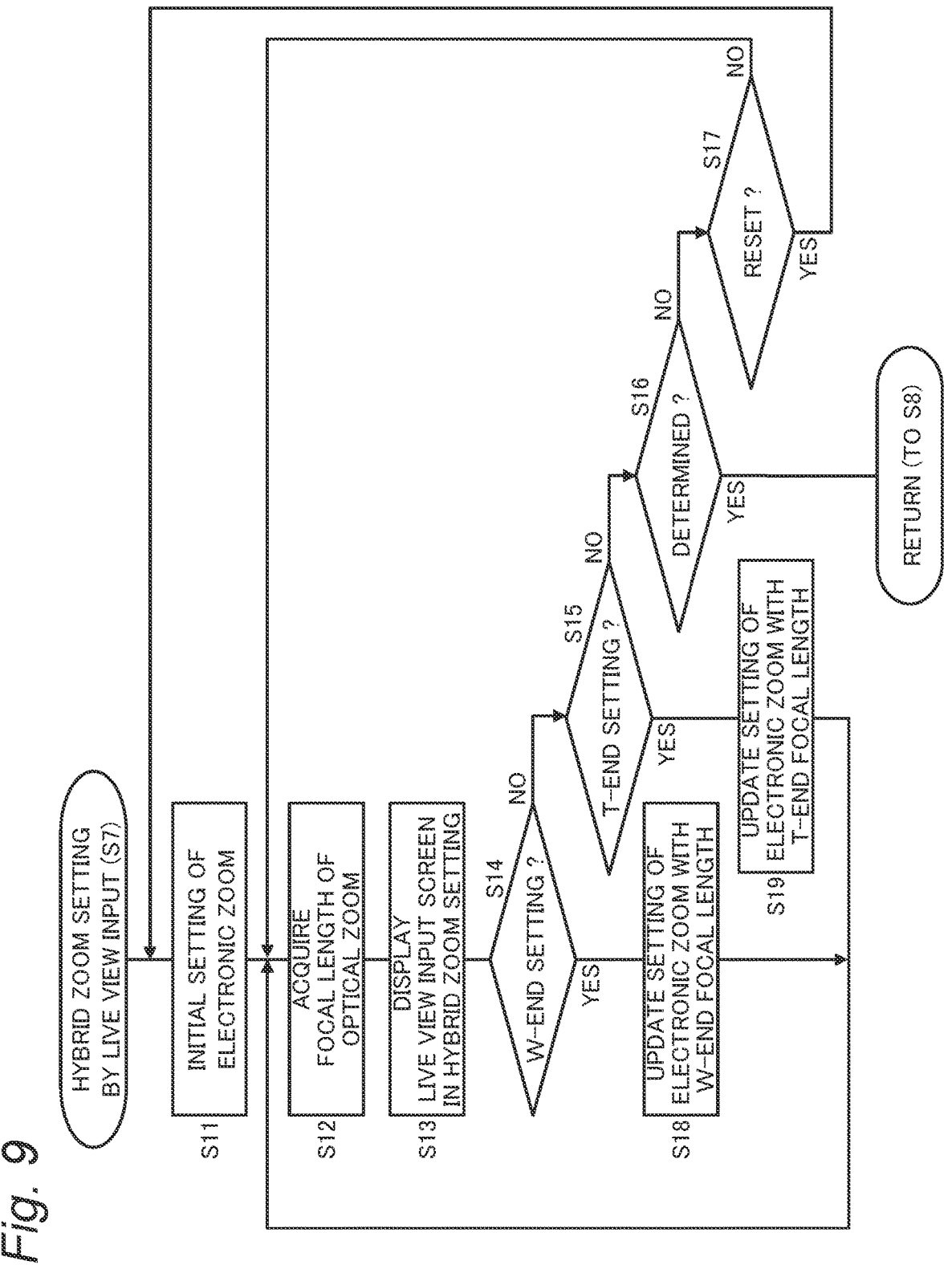
FIG. 9 is a flowchart illustrating processing of hybrid zoom setting by live view input.

FIG. 9 is a flowchart illustrating processing (S6 in FIG. 3) of hybrid zoom setting by live view input. For example, the processing shown in the flow in FIG. 9 is started when a user operation of the option "live view input" in the menu display in FIG. 4 is input ((iii) in S4).

FIGS. 10A to 10D illustrate live view input screens in the hybrid zoom setting in FIG. 9. Hereinafter, an example in which the focal length at the W end is set and then the focal length at the T end is set will be described as an example of the setting method (iii), but the setting order of the W end and the T end is not particularly limited, and may be the reverse order.

In the flow in FIG. 9, the camera controller 140 performs initial setting of electronic zoom for displaying the live view input screen, for example (S11). For example, the initial setting in step S11 is a setting in which the focal length range is the widest range that can be set in the hybrid zoom operation according to the setting of the image-shooting range or the like in the digital camera 1, and is set e.g. as in the setting method (i).

The camera controller 140 acquires data on the current focal length of the zoom lens 220 according to the rotation angle of the zoom ring 222 from the interchangeable lens 200 via the body mount 160 (S12). The camera controller 140 causes the display monitor 130 to display the live view input screen, based on the above various information (S13).

Figures 10A, 10B, 10C, 10D:
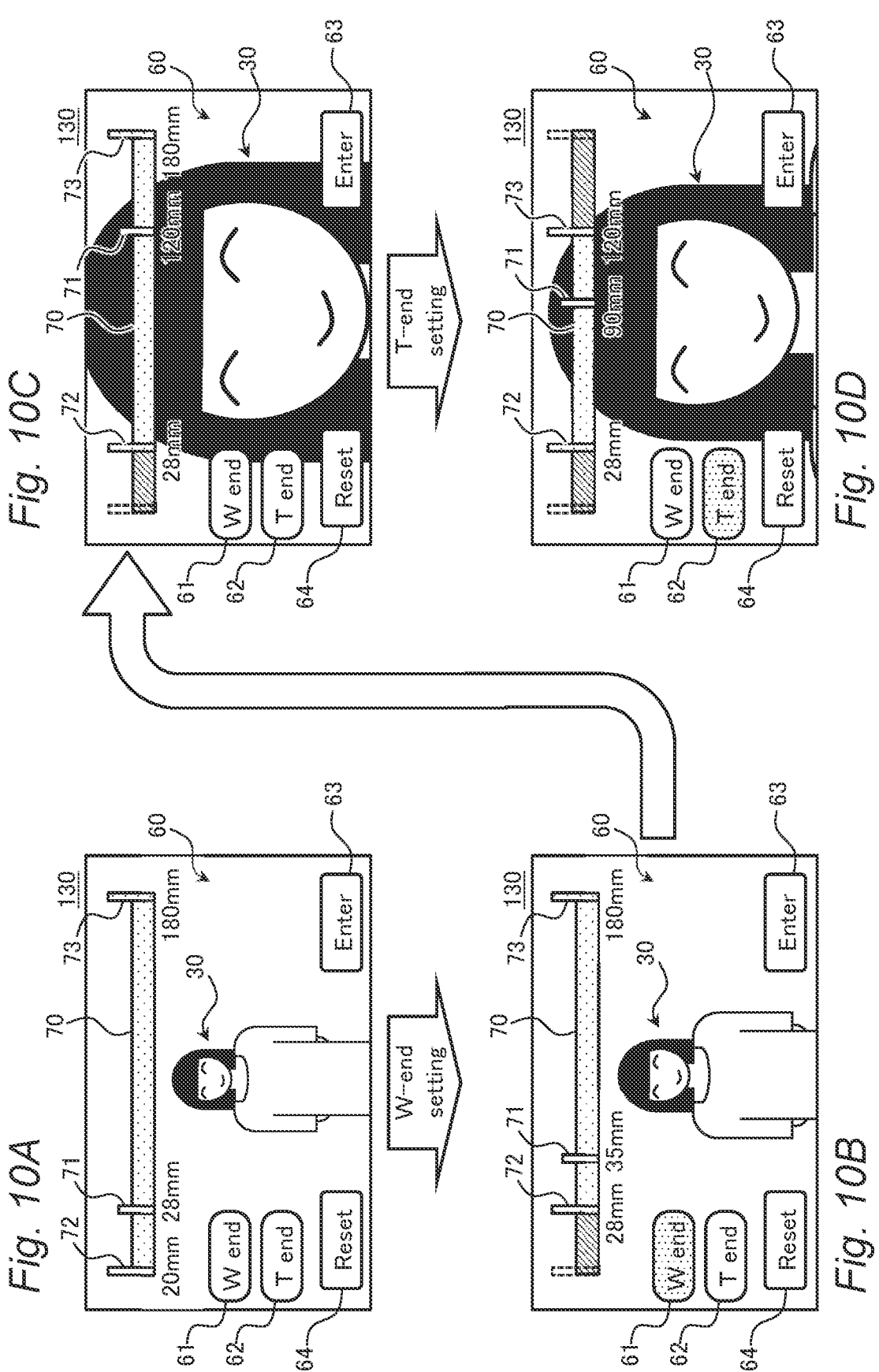
FIGS. 10A to 10D are diagrams showing a display example of a live view input screen for hybrid zoom setting.

FIG. 10A illustrates an initial state of the live view input screen in the hybrid zoom setting. For example, as shown in FIG. 10A, the live view input screen includes a live view image 60, a focal length indicator 70, and various buttons 61 to 64. The various buttons 61 to 64 on the live view input screen include a W-end setting button 61, a T-end setting button 62, an enter button 63, and a reset button 64.

On the live view input screen, the live view image 60 indicates a result of applying the electronic zoom under setting to a real-time captured image by the image sensor 110. The focal length indicator 70 includes, for example in a bar display, a current marker 71, a W-end marker 72, and a T-end marker 73, and visualizes various states of the focal length to be set in the digital camera 1.

The current marker 71 indicates the current focal length in the digital camera 1 corresponding to the rotation angle and the like of the zoom ring 222, for example. The W-end marker 72 indicates the focal length at the W end under setting to the digital camera 1. The T-end marker 73 indicates the focal length at the T end under setting to the digital camera 1. In the example in FIG. 10A, the W-end marker 72 is disposed at the minimum value and the T-end marker 73 is disposed at the maximum value in the focal length indicator 70, for example.

The camera controller 140 receives user operations of the various buttons 61 to 64 via the operation unit 150 with the display monitor 130 displaying the above live view input screen (S14 to S17). The user operation of the various buttons 61 to 64 may be a touch operation on the live view input screen, a physical button depressing operation corresponding to the various buttons 61 to 64, or the like.

The W-end setting button 61 receives a user operation for setting the focal length at the W end in the hybrid zoom operation (S14). The T-end setting button 62 receives a user operation for setting the focal length at the T end in the hybrid zoom operation (S15). The enter button 63 receives a user operation for determining the focal length range in the hybrid zoom setting (S16). The reset button 64 receives a user operation for resetting the focal length range in hybrid zoom setting (S17).

The respective setting buttons 61 and 62 receive inputs of the focal length at the W end/T end within a range as in the setting method (ii), for example. The focal length indicator 70 may display, in a highlighted manner, the above ranges that allow input.

FIG. 10A illustrates a state in which the zoom ring 222 is rotated so as to be from the angle of view at the W end in FIG. 2A to the angle of view as in FIG. 2B, for example. The camera controller 140 controls the position of the current marker 71 at any time in the focal length indicator 70 based on the focal length of the current optical zoom received from the interchangeable lens 200 and the setting of the electronic zoom. According to the above live view input screen, the user can view the live view image 60 with rotating and operating the zoom ring 222, capable of checking various angles of view of the hybrid zoom operation by the current setting, for example.

For example, in the live view image 60 on the live view input screen, the user can reach a desired angle of view as the W end as illustrated in FIG. 10A by operating the zoom ring 222 so that the object 31 not desired to appear in FIG. 2A is out of the angle of view range. As described above, according to the live view input of the present embodiment, the digital camera 1 can facilitate the user to reach the state of the focal length at the W end desired by the user.

For example, when the live view image 60 has a desired angle of view as the W end, the user operates the W-end setting button 61 (YES in S14). Then, the camera controller 140 updates the setting of the electronic zoom so as to change the focal length of the current marker 71 at the time of operating the W-end setting button 61 to the focal length at the W end of the hybrid zoom operation (S18). The processing in step S18 can be performed as in step S16 of the setting method (ii), for example (see FIGS. 6A to 6C).

After the setting of the focal length at the W end (S18), the controller 140 performs the processing in and after step S12 again. A display example of the live view input screen updated by the subsequent step S13 is illustrated in FIG. 10B.

FIG. 10B shows the display example of a state in which the W-end setting button 61 is operated from the state in FIG. 10A. In the present display example, the W-end marker 72 is arranged at the same focal length as the current marker 71 in FIG. 10A. For example, in step S3 after the setting of the focal length (S18) at the W end, the camera controller 140 changes the arrangement of the W-end marker 72 in the focal length indicator 70, and gray-out displays a portion corresponding to the focal length shorter than the changed W-end marker 72.

In the example in FIG. 10B, the rotation angle of the zoom ring 222 is the same as that in the state in FIG. 10A. Therefore, based on the updated electronic zoom magnification according to the rotation angle of the zoom ring 222, the current marker 71 of the focal length indicator 70 moves toward the T end, and the angle of view of the live view image is enlarged. For example, when the zoom ring 222 is operated until the W end from the state in FIG. 10B, the angle of view in FIG. 10A can be reproduced.

FIG. 10C illustrates a state in which the zoom ring 222 is operated toward the T end from the state in FIG. 10B and the angle of view at the T end in FIG. 2C is not reached. For example, in the live view image 60 on the live view input screen, the user can reach a desired angle of view as the T end as illustrated in FIG. 10C by operating the zoom ring 222 to such an extent that a portion desired to be imaged of the subject 30 is within the angle of view as in FIG. 2C. As described above, according to the live view input of the present embodiment, the digital camera 1 is possible to easily reach also the state of the focal length at the T end desired by the user.

Similarly to the time of setting of the W end, the user operates the T-end setting button 62 when the live view image 60 reaches a desired angle of view as the T end (YES in S15). Then, the camera controller 140 updates the setting of the electronic zoom so as to change the focal length of the current marker 71 at the time of operating the T-end setting button 62 to the focal length at the Tend of the hybrid zoom operation (S19). The processing in step S19 can be performed as in step S18 or the like, for example.

After the setting of the focal length at the T end (S19), the controller 140 performs the processing in and after step S12 again. A display example of the live view input screen updated by the subsequent step S13 is illustrated in FIG. 10D.

FIG. 10D shows a display example of a state in which the T-end setting button 62 is operated from the state in FIG. 10C. In the present display example, the T-end marker 73 is arranged at the same focal length as the current marker 71 in FIG. 10C. For example, in step S3 after the setting of the focal length (S19) at the T end, the camera controller 140 changes the arrangement of the T-end marker 73 in the focal length indicator 70, and gray-out displays a portion corresponding to the focal length longer than the changed T-end marker 73.

The user can operate the enter button 63 when a desired focal length range is obtained. When the enter button 63 is operated (YES in S16), the camera controller 140 ends step S7 in FIG. 3 and proceeds to step S8. Accordingly, setting information for achieving the focal length range at the time of operating the enter button 63 is stored in step S8.

The user can operate the reset button 64 when the user desires to correct the setting of the focal length at the W/T end after operating the W/T end setting buttons 61 and 62 in the middle of the hybrid zoom setting as described above. When the reset button 64 is operated (YES in S17), the camera controller 140 returns to step S11. Accordingly, the user can perform correction such as temporarily increasing the focal length at the W end and then decreasing the focal length again or decreasing the focal length at the T end and then increasing the focal length again in the hybrid setting.

According to the hybrid zoom setting of the live view input by the above setting method (iii), the user can set the desired focal length at the W/T end while checking the actual angle of view on the live view input screen (FIGS. 10A to 10D) even when the user does not know a particularly desirable focal length range. Thus, setting of any focal length at the W/T end of the user in the hybrid zoom setting can be facilitated, and the hybrid zoom operation can be easily used in the digital camera 1.

The digital camera 1 of the present embodiment may display numerical value information on the focal length on the live view input screen, as exemplified in FIGS. 10A to 10D. The numerical information on the focal length includes the focal length corresponding to the position of the current marker 70, the focal length corresponding to the position of the W-end marker 71, and the focal length corresponding to the position of the T-end marker 72. According to the above live view input screen, the user of the digital camera 1 can determine a desired focal length range while checking both the live view image 60 and the numerical value of the focal length.

3. SUMMARY

As described above, each of the digital camera 1 and the camera body 100 being examples of the imaging apparatus of the present embodiment includes an image sensor 110 being an example of the image sensor, a body mount 160 being an example of the input interface, a camera controller 140 being an example of the controller, and an operation unit 150 being an example of the setting interface. The image sensor 110 captures a subject image via the interchangeable lens 200 being an example of an optical system, and generates image data. The input interface acquires optical focal length data as an example of the zoom amount indicating the degree of the zoom operation of the user related to the interchangeable lens 200. The camera controller 140 scales, i.e., changes magnification (see FIG. 6B) of the image cropped from the image data according to the zoom amount from the input interface so as to change the focal length (see FIG. 6C) of the hybrid zoom operation being an example of the second focal length corresponding to the angle of view of the subject image in the image data from the optical focal length (see FIG. 6A) being an example of the first focal length by the interchangeable lens 200. The setting interface sets a setting range that enables the second focal length to change according to the zoom amount based on a user operation being input before the zoom operation (see FIG. 3).

According to the above imaging apparatus, the range of the focal length in the hybrid zoom operation in which the electronic zoom is performed together with the optical zoom can be set by a user operation in advance, for example. Accordingly, it is possible to easily capture an image in a range of a focal length desirable for the user.

In the imaging apparatus of the present embodiment, the interchangeable lens 200 includes a zoom lens 220 having a wide-angle end (W end) and a telephoto end (T end). The camera controller 140 changes the second focal length to the lower limit value of the setting range according to the zoom operation reaching the W end (see FIG. 2B) and changes the second focal length to the upper limit value of the setting range according to the zoom operation reaching the T end (see FIG. 2D) based on the setting range of the focal length of the hybrid zoom operation by the user operation. Accordingly, it is possible to preset the focal length range from the W end to the T end in the hybrid zoom operation in which the electronic zoom is performed linked together with the optical zoom by the zoom lens 220, and it is possible to easily capture an image using zooming.

In the imaging apparatus of the present embodiment, the camera controller 140 changes magnification of the image to be cropped so as to gradually change the second focal length according to the first focal length changed in the zoom lens 220 in response to the zoom operation. Accordingly, at the time of the hybrid zoom operation, the electronic zoom can be gradually interlocked with the optical zoom according to the degree of the zoom operation, and discomfort or the like due to the operation of the electronic zoom can be suppressed.

In the imaging apparatus of the present embodiment, the interchangeable lens 200 further includes a zoom ring 222 as an example of an operation member that receives a zoom operation and drives the zoom lens 220 to change the first focal length. The zoom amount indicates the first focal length changed by the zoom ring 222. Such a zoom amount may be a rotation angle of the zoom ring 222. The input interface of the imaging apparatus can appropriately acquire the zoom amount according to various mechanisms of zoom operation in the optical system such as the interchangeable lens 200.

In the imaging apparatus of the present embodiment, within a range between the lower limit value (i.e., the optical focal length fw at the W end) of the first focal length and a focal length of predetermined n times the upper limit value (i.e., the optical focal length ft at the T end) of the first focal length, the setting interface sets the setting range for the second focal length (see FIGS. 6 and 8). The n times is a magnification of the number of pixels at the time of imaging in the image sensor 110 with respect to the number of pixels set depending on the image-shooting range, the shooting image quality, and the like in order to output the image data as the image-shooting result by the digital camera 1. Accordingly, the number of pixels of the image cropped and changed in magnification by the electronic zoom can be made equal to or larger than the number of pixels for outputting the image-shooting result, and the image quality of the image shooting using the hybrid zoom operation can be easily ensured.

In the imaging apparatus of the present embodiment, the setting interface receives, as the user operation described above, an operation of setting the focal length n×ft being n times the upper limit value ft of the first focal length to the upper limit value of the setting range in the focal length of the hybrid zoom operation (See FIG. 5 and S5 in FIG. 3). By the above setting method (i) of the hybrid zoom operation, user setting for extending the focal length can be easily performed.

In the imaging apparatus of the present embodiment, the setting interface receives, as the user operation described above, an operation of inputting a numerical value indicating at least one of an upper limit value and a lower limit value of a setting range in the focal length of the hybrid zoom operation (see FIG. 7 and S6 in FIG. 3). By the above setting method (ii) of the hybrid zoom operation, the focal length range of the numerical value known to the user can be easily set to the hybrid zoom operation.

In an eighth aspect according to the present disclosure, in the imaging apparatus according to any one of the first to seventh aspects, the camera controller 140 causes a predetermined display screen to display an image cropped from image data and changed in magnification, and the setting interface receives, as the above user operation, an operation of inputting at least one of an upper limit value and a lower limit value of a setting range according to the image displayed on the display screen.

Other Embodiments

As described above, the first embodiment is described as an example of the technique disclosed in the present application. However, the technique in the present disclosure is not limited thereto, and can also be applied to embodiments in which changes, substitutions, additions, omissions, and the like are made as appropriate. In addition, it is also possible to combine each component described in each of the above-described embodiments to form a new embodiment. Thus, in the following, other embodiments will be exemplified.

In the above first embodiment, the digital camera 1 that performs optical zoom by the zoom lens 220 has been described. In the present embodiment, the digital camera 1 does not need to include the zoom lens 220, and the interchangeable lens 200 may be a single focal length lens. For example, instead of the rotation operation of the zoom ring 222 in the first embodiment, by the user operation of the focus ring 212 of the interchangeable lens 200, the electronic zoom as in the first embodiment may be performed in the digital camera 1 by using the focusing operation of moving the focus lens 210 as the zoom operation. Regarding the above electronic zoom operation, the digital camera 1 of the present embodiment sets the electronic zoom magnification corresponding to the focal length range from the wide-angle end to the telephoto end based on the user operation as with the hybrid zoom setting of the first embodiment.

That is, in the imaging apparatus of the present embodiment, the interchangeable lens 200 includes the focus lens 210. The zoom operation is an operation of driving the focus lens in the interchangeable lens 200. The camera controller 140 changes in magnification the image to be cropped according to the operation of driving the focus lens. Also with this, in the electronic zoom operation using the focus ring 212, as in the first embodiment described above, the focal length range can be set to a range desired by the user, and image shooting using zooming can be easily performed. For example, zooming at the time when the bright interchangeable lens 200 such as a single focal length lens is used can be easily performed.

In the above embodiments, the digital camera 1 including the zoom ring 222 has been described. In the present embodiment, the digital camera 1 does not need to include the zoom ring 222, and the zoom operation may be received by other operation members. Such an operation member may be e.g. a zoom lever provided in the interchangeable lens 200 or various operation members provided for receiving a zoom operation in the camera body 100. In the present embodiment, the input interface of the imaging apparatus may be such various operation members, or may have various configurations for acquiring the zoom amount of the zoom operation by the various operation members.

In the above embodiments, the electronic zoom magnification has been set so that an image cropped from the imaging data of the image sensor 110 by electronic zoom is equal to or larger than the image-shooting range set in the digital camera 1. In the digital camera 1 of the present embodiment, electronic zoom may be performed in which the zoom magnification is increased until the cropped image becomes smaller than the set image-shooting range. In this case, the resolution of the image quality setting may be restored by processing such as pixel interpolation.

In the above embodiments, an example has been described in which numerical value input or the like of the focal length range is performed in the hybrid zoom setting of the digital camera 1. The digital camera 1 of the present embodiment may be configured to be able to reproduce a focal length range input in the past for each interchangeable lens 200, for example. Accordingly, the user can use a desired focal length range without inputting a numerical value or the like of the focal length range each time, and can easily use the hybrid zoom operation of the digital camera 1.

For example, in the digital camera 1 of the present embodiment, the camera controller 140 records the lens data such as the focal length information or the serial number of the interchangeable lens 200 when the focal length range is input by the user operation in the flash memory 142 in association with the input focal length range. Thereafter, the camera controller 140 may acquire lens data from the interchangeable lens 200 mounted on the camera body 100, and reproduce and set the past focal length range based on the acquired lens data. For example, the digital camera 1 may present such a reproduced focal length range as a new option on the selection screen (FIG. 5), or may use the reproduced focal length range for an initial value of the numerical value input screen (FIG. 5) or the like.

In the above embodiments, an operation example in which the focal length linearly changes with respect to the rotation angle of the zoom ring 222 in the hybrid zoom operation of the digital camera 100 has been described, but the focal length does not need to change particularly linearly. In the digital camera 100 of the present embodiment, the focal length in the hybrid zoom operation may be appropriately changed according to the degree of the zoom operation such as the rotation operation of the zoom ring 222. For example, the digital camera 1 of the present embodiment may implement a change manner in which the focal length of the hybrid zoom operation changes quickly or gently in the initial and/or final stage and the period in the middle of the zoom operation. In the digital camera 1 of the present embodiment, the camera controller 140 may appropriately change in magnification the image cropped by the electronic zoom so as to gradually change the focal length of the hybrid zoom operation according to the zoom operation.

In the above embodiments, the digital camera 1 including the display monitor 130 has been described, but the digital camera 1 of the present embodiment does not particularly need to include the display monitor 130. In the present embodiment, the digital camera 1 may include an interface circuit that causes an external display monitor to display various information, and may be a box camera or the like, for example. The digital camera 1 of the present embodiment may include both the above interface circuit and the display monitor 130.

In the above embodiments, the digital camera 1 including the card slot 170 has been described. In the present embodiment, the digital camera 1 does not particularly need to include the card slot 170. The digital camera 1 of the present embodiment is not particularly limited to recording in the memory card 171, and may include a slot or the like for recording image data in various recording media such as an SSD. The digital camera 1 of the present embodiment does not need to include such a slot or the like, and for example, may upload image data to a cloud server or the like via the communication module 155.

In the above embodiments, an interchangeable lens type digital camera is described as an example of the imaging apparatus, but the imaging apparatus of the present embodiment may be not in particular an interchangeable lens type digital camera. The idea of the present disclosure may be applied not only to a digital camera but also to a movie camera, and can also be applied to an electronic apparatus having various imaging functions such as a mobile phone or a PC with a camera.

Summary of Aspects

Hereinafter, various aspects according to the present disclosure will be appended.

A first aspect according to the present disclosure is an imaging apparatus including: an image sensor configured to capture a subject image via an optical system to generate image data; an input interface configured to acquire a zoom amount indicating a degree of a zoom operation of a user related to an optical system; a controller configured to scale (change in magnification) an image cropped from image data to change, from a first focal length, a second focal length, according to a zoom amount from the input interface, the first focal length being formed by the optical system and the second focal length corresponding to an angle of view of the subject image in the image data; and a setting interface configured to set a setting range, based on a user operation input before the zoom operation, the setting range enabling the second focal length to change according to the zoom amount.

A second aspect according to the present disclosure includes the imaging apparatus according to the first aspect, wherein the optical system includes a zoom lens having a wide-angle end and a telephoto end, and wherein based on the setting range by the user operation, the controller is configured to: change the second focal length to a lower limit value of the setting range according to the zoom operation reaching the wide-angle end; and change the second focal length to an upper limit value of the setting range according to the zoom operation reaching the telephoto end.

A third aspect according to the present disclosure includes the imaging apparatus according to the second aspect, wherein the controller is configured to scale the cropped image to change the second focal length gradually as the first focal length is changed in response to the zoom operation in the zoom lens.

A fourth aspect according to the present disclosure includes the imaging apparatus according to the second or third aspect, wherein the optical system further includes an operation member configured to receive the zoom operation to drive the zoom lens for changing the first focal length, and wherein the zoom amount indicates the first focal length changed by the operation member.

A fifth aspect according to the present disclosure includes the imaging apparatus according to any one of the first to fourth aspects, wherein the setting interface is configured to set a setting range for the second focal length within a range between a lower limit value of the first focal length and a predetermined focal length that is a predetermined multiple of an upper limit value of the first focal length, and wherein the predetermined multiple is a magnification of the number of pixels for image-capturing in the image sensor with respect to the number of pixels set to output image data as an image-shooting result by the imaging apparatus.

A sixth aspect according to the present disclosure includes the imaging apparatus according to any one of the first to fifth aspects, wherein the setting interface is configured to receive, as the user operation, an operation to set a predetermined focal length to an upper limit value of the setting range, the predetermined focal length being a predetermined multiple of an upper limit value of the first focal length.

A seventh aspect according to the present disclosure includes the imaging apparatus according to any one of the first to sixth aspects, wherein the setting interface is configured to receive, as the user operation, an operation to input a numerical value indicating at least one of the upper limit value or the lower limit value of the setting range.

An eighth aspect according to the present disclosure includes the imaging apparatus according to any one of the first to seventh aspects, wherein the controller is configured to cause a predetermined display screen to display an image cropped from image data for scaling, and wherein the setting interface is configured to receive, as the user operation, an operation to input at least one of an upper limit value or a lower limit value of a setting range referring to the displayed image on the display screen.

A ninth aspect according to the present disclosure includes the imaging apparatus according to any one of the first to eighth aspects, wherein the optical system includes a focus lens, wherein the zoom operation is an operation to drive the focus lens in the optical system, and wherein the controller is configured to scale the image to be cropped according to an operation to drive the focus lens.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be certified that these non-essential components are essential immediately because these non-essential components are described in the accompanying drawings and the detailed description.

In addition, since the above embodiment is for exemplifying the technique in the present disclosure, various changes, substitutions, additions, omissions, and the like can be made within the scope of the claims or the equivalent thereof.

The present disclosure is applicable to various imaging apparatuses having an electronic zoom function, for example.

The invention claimed is:

1. An imaging apparatus comprising:
an image sensor configured to capture a subject image via an optical system to generate image data;
an input interface configured to acquire a zoom amount indicating a degree of a zoom operation by a user operation on an optical system;
a controller configured to scale a cropped image from the image data to change, from a first focal length, a second focal length, according to the zoom amount dynamically changed by the user operation and acquired by the input interface, the first focal length being formed by the optical system and the second focal length corresponding to an angle of view of the cropped image in the image data; and
a setting interface configured to set a setting range, based on an another user operation input to the setting interface, by setting a corresponding range to scale the cropped image from the image data, the setting range enabling the second focal length to change according to the zoom amount,
wherein the setting interface is configured to set the corresponding range to scale the cropped image such that a scaling factor in the corresponding range is not greater than a predefined scaling factor that is defined by a first number of pixels for the image sensor to capture the image with respect to a second number of pixels preset to output the image data as an image-shooting result by the imaging apparatus.

2. The imaging apparatus according to claim 1,
wherein the optical system includes a zoom lens having a wide-angle end and a telephoto end, and
wherein based on the setting range set by the user operation, the controller is configured to:
change the second focal length to a lower limit value of the setting range, according to the zoom operation reaching the wide-angle end; and
change the second focal length to an upper limit value of the setting range, according to the zoom operation reaching the telephoto end.

3. The imaging apparatus according to claim 2,
wherein the controller is configured to scale the cropped image to change the second focal length gradually as the first focal length is changed in response to the zoom operation in the zoom lens.

4. The imaging apparatus according to claim 2,
wherein the optical system further includes an operation member configured to receive the zoom operation to drive the zoom lens for changing the first focal length, and
wherein the zoom amount indicates the first focal length changed by the operation member.

5. The imaging apparatus according to claim 1,
wherein the setting interface is configured to set the setting range for the second focal length within a range between a lower limit value of the first focal length and a predetermined focal length that is a predetermined multiple of an upper limit value of the first focal length, and
wherein the predetermined multiple is a magnification of the first number of pixels with respect to the second number of pixels.

6. The imaging apparatus according to claim 1,
wherein the setting interface is configured to receive, as the user operation, an operation to set a predetermined focal length to an upper limit value of the setting range, the predetermined focal length being a predetermined multiple of an upper limit value of the first focal length.

7. The imaging apparatus according to claim 1,
wherein the setting interface is configured to receive, as the user operation, an operation to input a numerical value indicating at least one of the upper limit value or the lower limit value of the setting range.

8. The imaging apparatus according to claim 1,
wherein the optical system includes a focus lens,
wherein the zoom operation is an operation to drive the focus lens in the optical system, and
wherein the controller is configured to scale the cropped image, according to the operation to drive the focus lens.

9. The imaging apparatus according to claim 1,
wherein the setting interface is configured to set the corresponding range to increase the scaling factor from a lower limit to an upper limit in the zoom amount without decreasing the scaling factor therebetween.

10. An imaging apparatus comprising:
an image sensor configured to capture a subject image via an optical system to generate image data;
an input interface configured to acquire a zoom amount indicating a degree of a zoom operation by a user for an optical system;
a controller configured to scale a cropped image from the image data to change, from a first focal length, a second focal length, according to the zoom amount acquired by the input interface, the first focal length being formed by the optical system and the second focal length corresponding to an angle of view of the subject image in the image data; and
a setting interface configured to set a setting range, based on a user operation input before the zoom operation, the setting range enabling the second focal length to change according to the zoom amount,
wherein the controller is configured to cause a predetermined display screen to display an image cropped from the image data for scaling, and
wherein the setting interface is configured to receive, as the user operation, an operation to input at least one of an upper limit value or a lower limit value of the setting range referring to the displayed image on the display screen.

\* \* \* \* \*